United States Patent
He et al.

(10) Patent No.: US 10,641,922 B2
(45) Date of Patent: May 5, 2020

(54) METHOD AND SYSTEM FOR DIP PICKING AND ZONATION OF HIGHLY DEVIATED WELL IMAGES

(71) Applicant: Schlumberger Technology Corporation, Sugar Land, TX (US)

(72) Inventors: Alexis He, Clamart (FR); Josselin Kherroubi, Clamart (FR); Carlos Maeso, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 119 days.

(21) Appl. No.: 15/792,032

(22) Filed: Oct. 24, 2017

(65) Prior Publication Data

US 2018/0120477 A1 May 3, 2018

(30) Foreign Application Priority Data

Nov. 2, 2016 (EP) .................................. 16290212

(51) Int. Cl.
*G01V 1/40* (2006.01)
*G01V 11/00* (2006.01)
*G01V 1/50* (2006.01)
*G01V 3/18* (2006.01)

(52) U.S. Cl.
CPC .............. *G01V 11/002* (2013.01); *G01V 1/50* (2013.01); *G01V 3/18* (2013.01)

(58) Field of Classification Search
None
See application file for complete search history.

(56) References Cited

U.S. PATENT DOCUMENTS

| 4,357,660 A | 11/1982 | Hepp |
| 4,440,020 A | 4/1984 | Boutemy et al. |
| 4,939,649 A | 7/1990 | Duffy |
| 5,299,128 A | 3/1994 | Antoine et al. |

(Continued)

FOREIGN PATENT DOCUMENTS

| EP | 0379432 A1 | 7/1990 |
| EP | 2031423 A1 | 3/2009 |

(Continued)

OTHER PUBLICATIONS

Liu et al., Improved borehole image dip calculation in irregularly shaped and curved boreholes in high angle and horizontal wells, SPWLA 51st Annual Logging Symposium, Jun. 19-23, 2010 (7 pages).

(Continued)

*Primary Examiner* — Aditya S Bhat

(57) ABSTRACT

In one embodiment, a computer-based method includes obtaining a borehole image deriving from a downhole tool in a borehole of a geological formation, performing dip picking on the borehole image to derive one or more structural dips, deriving a continuous structural dip based on the one or more structural dips, defining one or more locations of zone boundaries on the borehole image, deriving one or more zone boundaries based on the continuous structural dip and the one or more locations of zone boundaries, and defining one or more zones of the wellbore in a second image based on the one or more zone boundaries.

13 Claims, 11 Drawing Sheets

(56) References Cited

U.S. PATENT DOCUMENTS

| | | | |
|---|---|---|---|
| 5,809,163 A | 9/1998 | Delhomme et al. | |
| 5,960,371 A | 9/1999 | Saito et al. | |
| 5,983,163 A | 11/1999 | Waid et al. | |
| 7,236,887 B2 | 6/2007 | Wang et al. | |
| 9,563,963 B2 * | 2/2017 | Elkington | G01V 1/42 |
| 9,619,731 B2 | 4/2017 | Akama et al. | |
| 10,151,857 B2 * | 12/2018 | Yamada | G01V 99/005 |
| 2013/0170713 A1 | 7/2013 | Kumar et al. | |
| 2015/0098627 A1 | 4/2015 | Ye | |
| 2016/0370480 A1 | 12/2016 | Shetty et al. | |

FOREIGN PATENT DOCUMENTS

| | | |
|---|---|---|
| WO | WO2014160994 A1 | 10/2014 |
| WO | WO2015131016 A1 | 4/2017 |

OTHER PUBLICATIONS

Extended Search Report issued in the related EP Application 16290212.6, dated May 4, 2017 (8 pages).

* cited by examiner

METHOD AND SYSTEM FOR DIP PICKING AND ZONATION OF HIGHLY DEVIATED WELL IMAGES

CROSS-REFERENCE TO RELATED APPLICATIONS

The present application claims priority to EP Application No. 16290212.6, which was filed on Nov. 2, 2016, and is incorporated herein by reference in its entirety.

BACKGROUND

This disclosure relates to a method and system for dip picking and zonation of highly deviated well images.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Wells are generally drilled into a surface (land-based) location or ocean bed to recover natural deposits of oil and natural gas, as well as other natural resources that are trapped in geological formations. A well may be drilled using a drill bit attached to the lower end of a "drill string," which includes a drill-pipe, a bottom hole assembly, and other components that facilitate turning the drill bit to create a borehole. For oil and gas exploration and/or monitoring, it may be desirable to obtain information about the subsurface formations that are penetrated by a borehole for analysis. More specifically, this may include obtaining downhole measurements and generating images that visualize characteristics of the subsurface formations.

For example, a borehole image may exhibit structural features, such as structural boundaries and faults. In some instances, the boundaries may be planar and are visible on a borehole image where they cross the borehole. Dip picking may refer to a process of determining the orientation of these boundaries based on visual information included in the borehole image. The orientation may include an inclination and an azimuth and may be referred to as "dip" herein. As may be appreciated, the boundaries and faults may separate the reservoir into depositional layers, structural units, and other geological volumes that can be further characterized. Zoning or zonation may refer to a process of dividing a borehole image into multiple areas of interest, where each area share similar properties (e.g., lithology, rock type, background resistivity, texture, etc.). It may be desirable to obtain accurate results from dip picking and zonation for enhanced geological interpretation.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

Systems and methods are provided for dip picking and zonation of a borehole image. An example of a computer-based method includes obtaining a borehole image deriving from a downhole tool in a borehole of a geological formation. The method also includes performing dip picking on the borehole image to derive one or more structural dips. The method also includes deriving a continuous structural dip based on the one or more structural dips. The method also includes defining one or more locations of zone boundaries on the borehole image. The method also includes deriving one or more zone boundaries based on the continuous structural dip and the one or more locations of zone boundaries, and defining one or more zones of the wellbore in a second image based on the one or more zone boundaries.

An example of a system may include one or more sensors configured to obtain a borehole image of a geological formation, and one or more data processing systems including one or more processors that receive the borehole image, and perform dip picking on the borehole image to derive one or more structural dips. Dip picking includes determining an orientation of one or more boundaries, faults, or both in the borehole image by identifying multiple dips at substantially the same time for each of the one or more boundaries, faults, or both. The orientation is characterized by an inclination and an azimuth (angles).

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
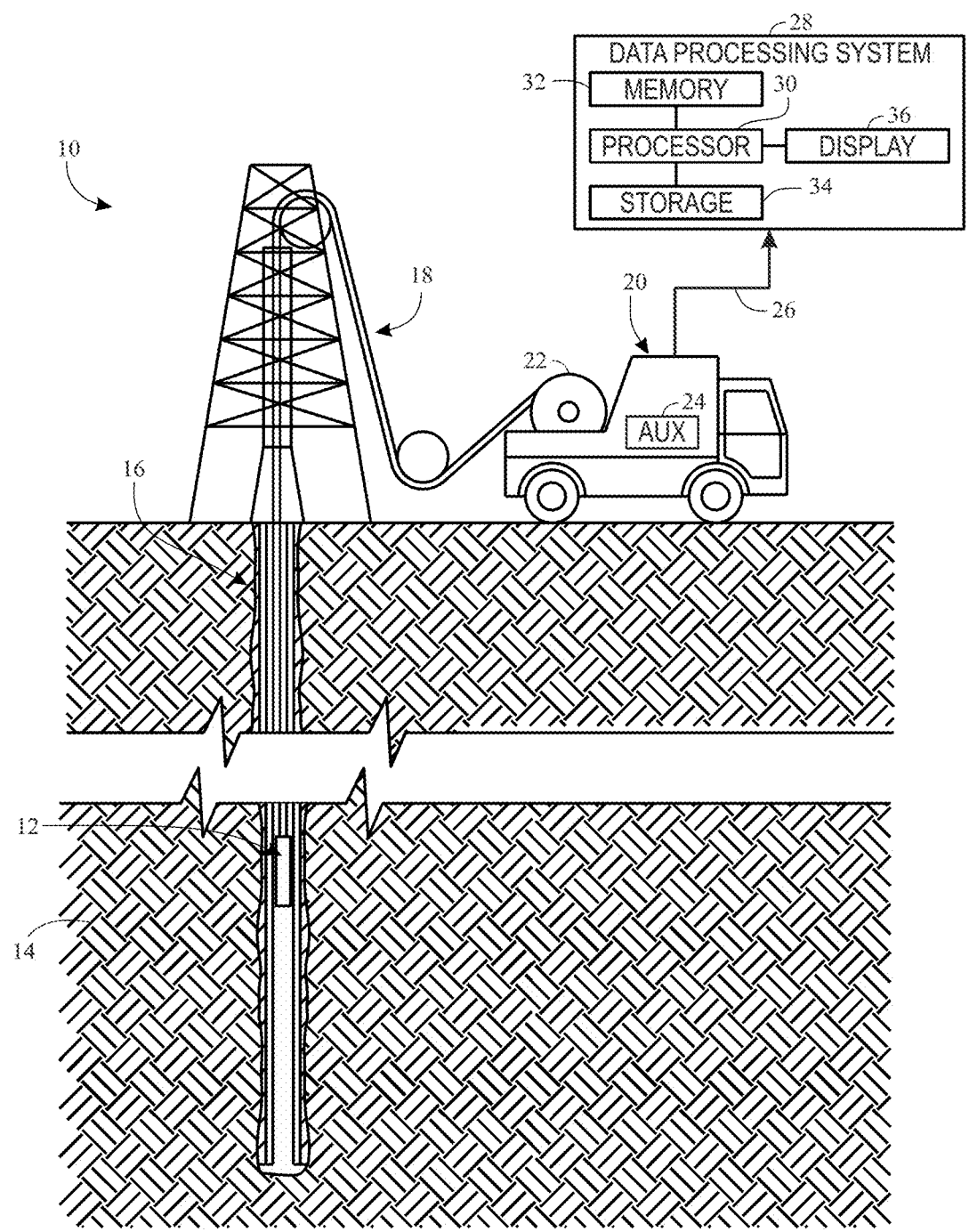
FIG. 1 is a schematic diagram of a well-logging system that employs a data processing system, in accordance with an embodiment.

Turning to the figures, FIG. 1 illustrates a well-logging system 10 that may be used to convey a downhole tool 12 through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses electrical sensors to obtain measurements of the wellbore 16 wall.

As discussed further below, the downhole tool 12 may include a number of sensors used to acquire data 26 about the wellbore 16 and/or geological formation 14 by taking measurements. For example, the data 26 may be images of the wellbore 16 obtained via electrical or electromagnetic sensor pads. It should be understood, however, that the images of the wellbore 16 may be obtained by the downhole tool 12 in any suitable way, including by acoustic or radiation-based sensors. The data 26 may be sent to a data processing system 28. The data 26 may be received by the data processing system 28 that performs complex data processing to generate the borehole image. The data processing system 28 may analyze the borehole image and perform dip picking and zonation of the images of the borehole wall, among other things. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may display the images generated by the processor 30. The data processing system 28 may be a local component of the logging winch system 20, a remote device that analyzes data from other logging winch systems 20, or partly local and partly remote. In some embodiments, the data processing system 28 may be a mobile computing device (e.g., tablet, smartphone, or laptop) or a server remote from the logging winch system 20.

Figure 2:
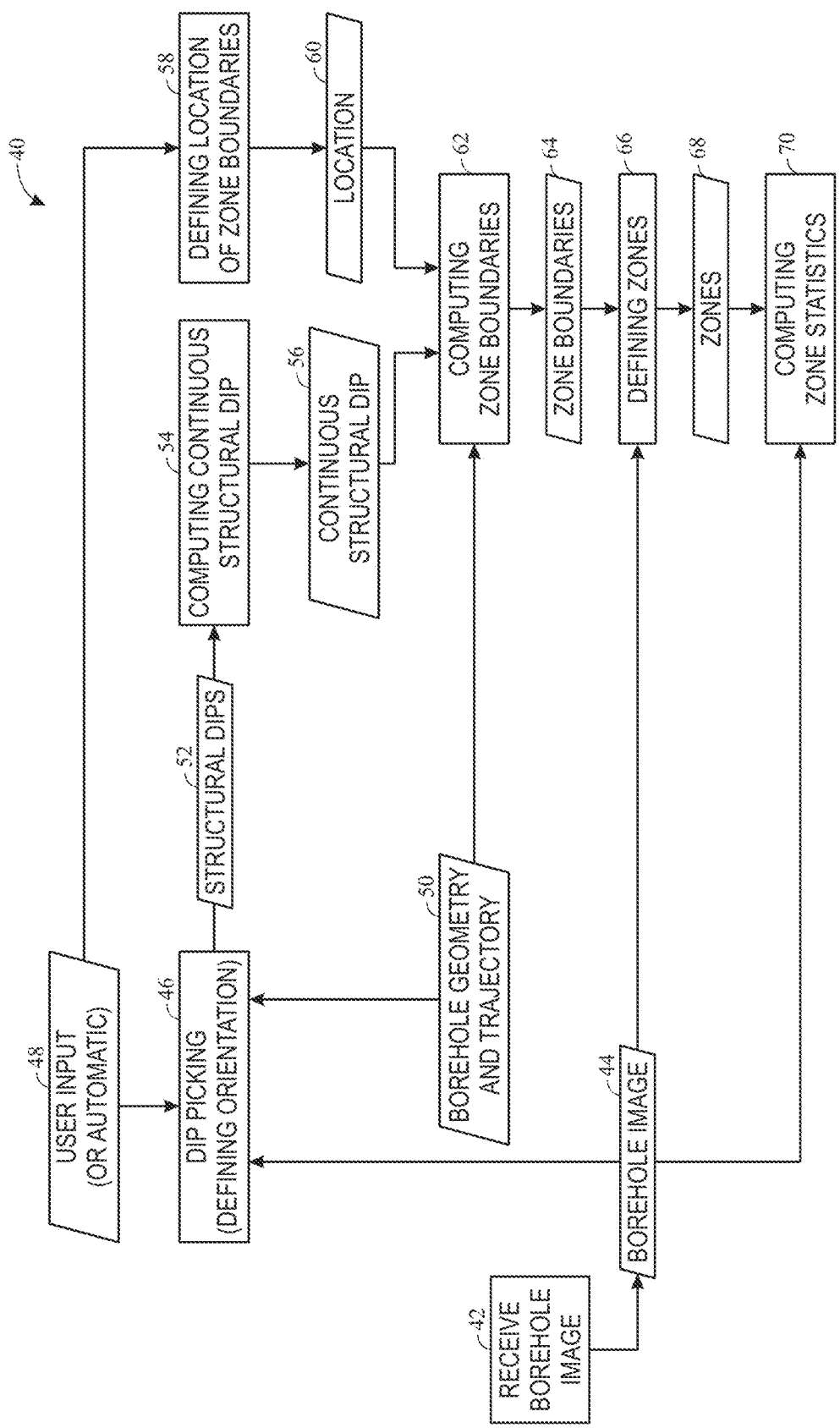
FIG. 2 is a flow diagram of a process for dip picking and zonation of a borehole image, in accordance with an embodiment.

FIG. 2 is a flow diagram of a process 40 for dip picking and zonation of a borehole image 44, in accordance with an embodiment. Although the following description of the process 40 is described with reference to the processor 30 of the data processing system 28, it should be noted that the process 40 may be performed by other processors disposed on other devices that may be capable of communicating with the data processing system 28, such as a server, a cloud-based computing system, or other components associated with the well-logging system 10. Additionally, although the following process 40 describes a number of operations that may be performed, it should be noted that the process 40 may be performed in a variety of suitable orders and some of the operations may not be performed. It should be appreciated that the process 40 may be wholly executed by the data processing system 28 or the execution may be distributed between the data processing system 28 and/or a server or cloud-based computing system. Further, it should be understood that the process 40 may be implemented as computer instructions stored on the memory 32 and/or the storage 34.

It should be noted that the process 40 illustrated in FIG. 2 is described at a high-level in the following paragraphs and at a more detailed level in the description pertaining to FIGS. 3-16. Referring now to the process 40, the processor 30 may receive (block 42) a borehole image 44 from the downhole tool 12. It should be noted that the borehole image 44 may be derived from a complex data processing workflow that processes the data 26 obtained from the downhole tool 12. In some embodiments, the processor 30 may also receive user inputs 48 (e.g., manual or automatic) related to locations on the borehole image 44 that are indicative of boundaries and/or faults. Additionally or alternatively, the processor 30 may receive information 50 related to borehole geometry and trajectory, which may be input by the user, received from sensors of the downhole tool 12, or the like. The borehole information 50 may indicate that the borehole image 44 includes a highly deviated or horizontal well. The processor 30 may perform (block 46) dip picking by defining an orientation of boundaries and/or faults in the borehole wall as indicated in the borehole image 44. Structural dips 52 may be derived (e.g., in the same borehole image 44 or a separate image) as a result of dip picking on the borehole image 44 including the highly deviated or horizontal well. Embodiments of the present disclosure related to dip picking are described in more detail below in the description pertaining regard to FIGS. 3-9.

The processor 30 may use the structural dips 52 to compute (block 54) a continuous structural dip 56. Further, the processor 30 may also use the user inputs 48 (e.g., manual or automatic) of locations of boundaries and/or faults to define (block 58) locations of zone boundaries 60. In some embodiments, the processor 30 may use the continuous structural dip 56, the locations of the zone boundaries 60, and/or the information 50 related to geometry and trajectory of the borehole to compute (block 62) zone boundaries 64. Based on the zone boundaries 64 and the borehole image 44, the processor 30 may define (block 66) zones 68 on the borehole image 44. The processor 30 may compute (70) zone statistics based on the defined zones 68 on the borehole image 44. Embodiments of the present disclosure related to zonation are described in more detail below in the description pertaining regard to FIGS. 10-16.

Dip Picking

One of the uses of borehole images 44 is the evaluation of the physical and petrophysical properties of the layers. Interpretation of a borehole image 44 may involve division of the borehole image 44 into multiple zones of interests. Geological boundaries such as structural boundaries and faults are good candidates as zone boundaries. As previously discussed, dip picking may refer to determining the dip (e.g., orientation characterized by an inclination and an azimuth) of the boundaries in the borehole image 44.

On vertical wells, a boundary may cross a borehole over a very short distance. For example, the borehole may be simplified as a straight cylinder, the boundary may be simplified as a plane, and the trace of the boundary on the borehole image 44 may be simplified as a sinusoid. In such a case, dip picking refers to fitting a sinusoid on the trace of the boundary sinusoid, which may provide a reliable estimation of the dip of the boundary on the vertical well.

Figure 3:
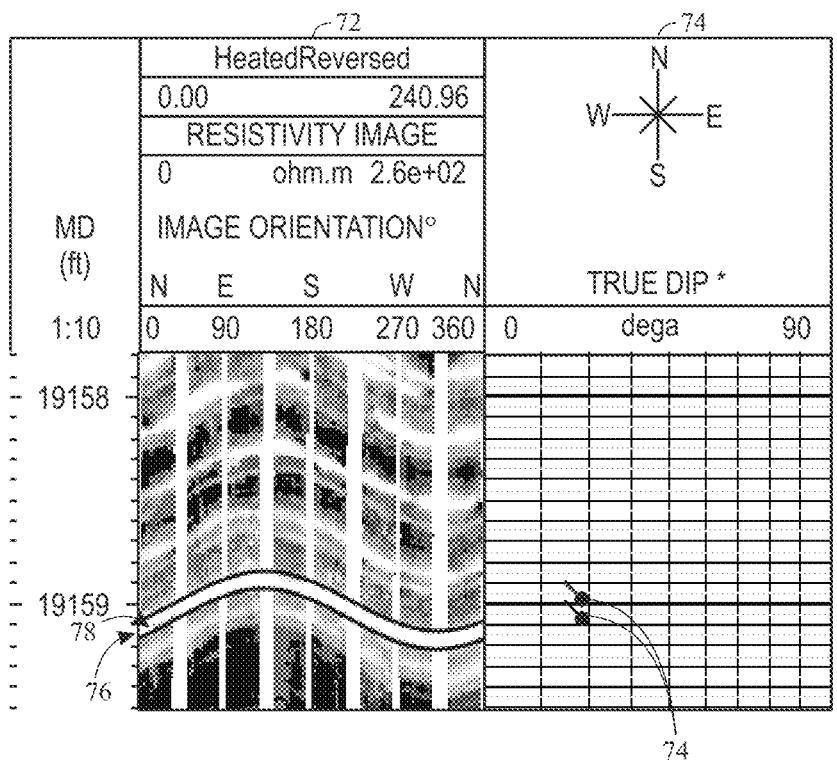
FIG. 3 illustrates a resistivity image of a vertical well with dips picked with sinusoids matching traces of the boundaries and a classification image of the dips.

For example, FIG. 3 illustrates a resistivity image 72 of a vertical well with dips 74 picked with sinusoids 76 matching traces of the boundaries 78 and a classification image 74 of the dips 74. As depicted, the resistivity image 72 include multiple boundaries 78 with sinusoid patterns crossing the borehole of a vertical well. The dips 74 have been picked with sinusoids matching the traces of the boundaries 78 (inclination=19', azimuth=310'). The dips 74 orientation are represented by tadpoles on the classification image 74.

Figure 4:
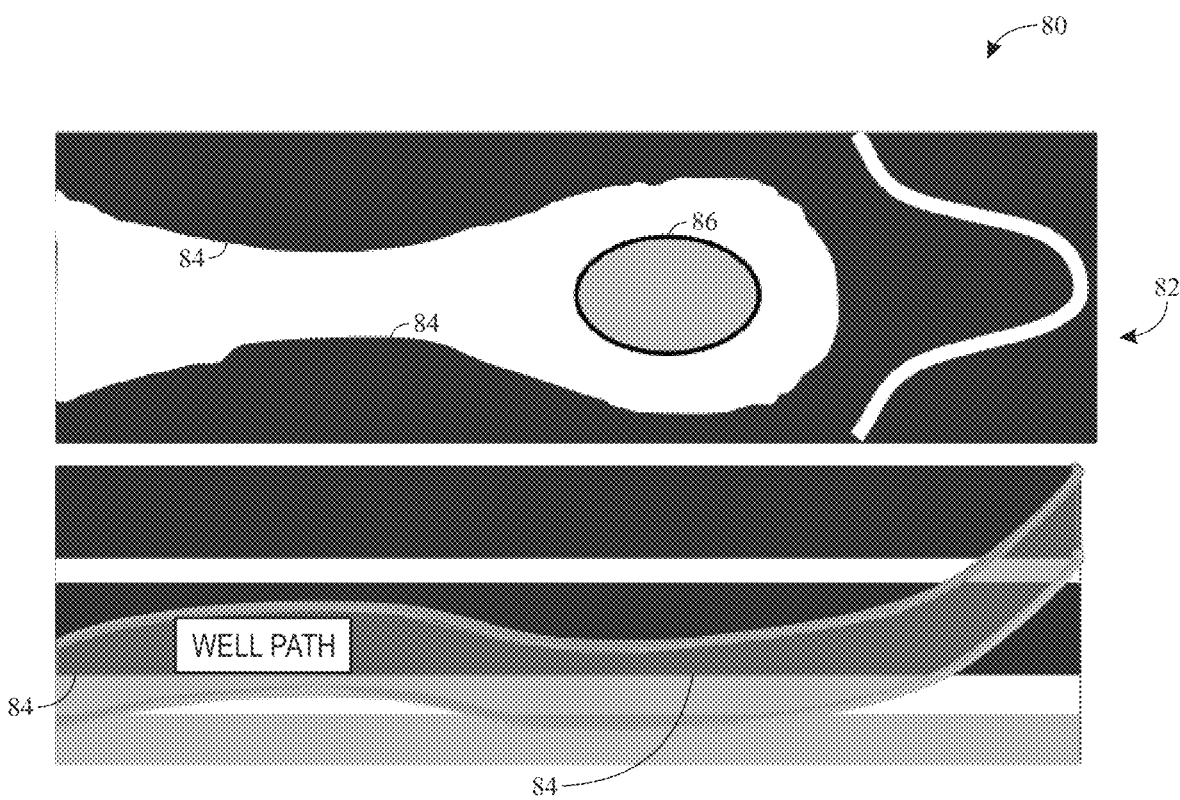
FIG. 4 illustrates an example of, at the top, a borehole image including a horizontal well, and at the bottom, a lateral representation of the horizontal well in accordance with an embodiment.

However, on highly deviated and horizontal wells, boundaries may be subparallel to the borehole trajectory. Therefore, boundaries may cross the borehole over long distances and the traces of the boundaries on the borehole image may have a much more varied shape (e.g., bulls-eye, "bee body shape"), as opposed to sinusoidal. For example, FIG. 4 illustrates an example of a borehole image 80 including a horizontal well 82, in accordance with an embodiment. As depicted, a boundary 84 followed by the well is not represented by a sinusoid. Indeed, another boundary 86 has the bulls-eye shape 86. Thus, the simplification applied on vertical wells cannot apply on horizontal wells, so manual or automatic dip picking methods that rely on fitting full sinusoids cannot be used.

Figure 5:
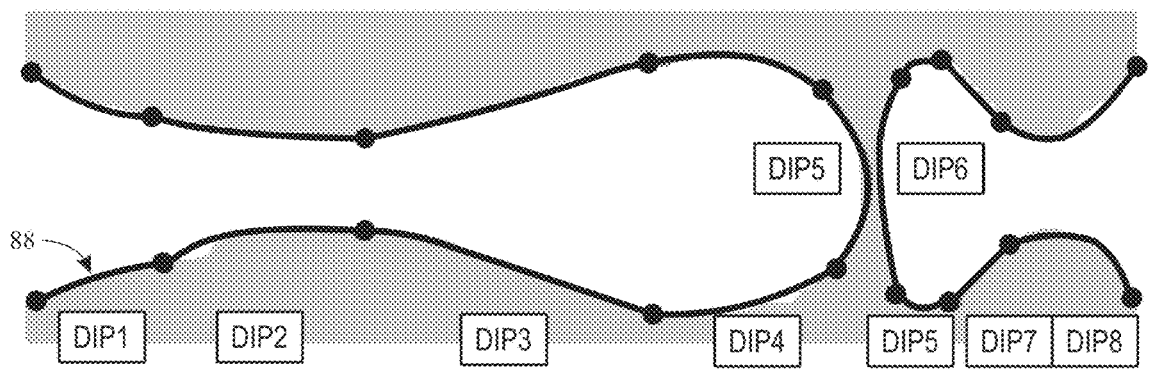
FIG. 5 illustrates a long-spanning boundary that includes multiple dips.

Some manual dip picking methods rely on fitting partial sinusoids but the methods are cumbersome to use and may just fit part of the boundary. For example, FIG. 5 illustrates a long-spanning boundary 88 that includes multiple dips (e.g., DIP1, DIP2, DIP3, DIP4, DIP5, DIP6, DIP7, and DIP8). The partial sinusoids in FIG. 5 are manually fit. As depicted, any change in the borehole trajectory or geometry or boundary orientation is picked with a different partial sinusoid (e.g., a different dip). The difficulty of performing dip picking on a single, long-spanning boundary 88, which is often the case in horizontal wells, is having to pick multiple dips to match the boundary, as shown in FIG. 5. Since a boundary is a continuous feature (except when severed by a fault), the picked dips should reflect the continuity of the boundary in some way. For example, the trace of the boundary on the borehole image 44 may be joined like shown in FIG. 5, and are tightly linked. However, manually picking each partial dip one by one independently from the others increases the chance of discontinuity or discrepancy with other dips.

Another challenge may be the accuracy of the results of dip picking. As noted, the boundaries in highly deviated or horizontal wells may be more or less subparallel to the borehole. Coupled with the geometry (caliper) and trajectory (deviation and azimuth) of the borehole, the dip becomes extremely sensitive in these configurations: small differences in the input (apparent azimuth of picked sinusoids) may imply much larger errors in the dip.

Figure 6:
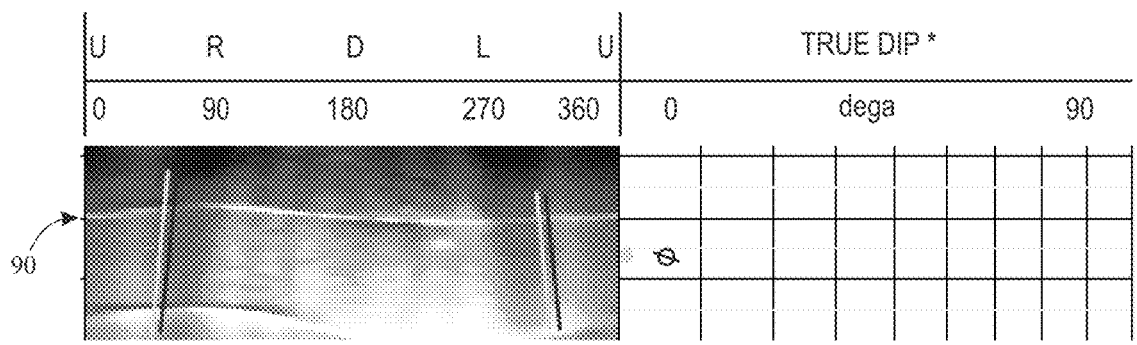
FIG. 6 illustrates a section of a horizontal well where the boundary is almost parallel to the borehole trajectory, in accordance with an embodiment.

For example, FIG. 6 illustrates a section of a horizontal well where the boundary 90 is almost parallel to the borehole trajectory. In the depicted example, two dips with a 6' apparent azimuth have a delta of 6' in dip inclination and 140' in dip azimuth. As may be appreciated, inaccurately picked dips may affect geological interpretation of the borehole image 44.

As such, some embodiments of the present disclosure address these challenges by providing techniques for at least dip picking targeted at highly deviated or horizontal wells (but also working for vertical wells), based on picking a batch of dips at once instead of picking dips one by one. Also, some embodiments provide techniques for at least computing dips taking into account the variations of the borehole geometry (caliper), the variations of the borehole trajectory (deviation and azimuth), and the variations of the boundary dip (inclination and azimuth). The dip may be estimated from an accurate three-dimensional (3D) representation of a plane crossing the borehole, instead of a sinusoid on a two-dimensional (2D) image. Combining both techniques together may enable more efficient and consistent dip picking on wells (e.g., horizontal and vertical). Additional techniques are disclosed herein that reports feedback to the user about the accuracy of the dip picking, and provides an automatic correction if desired. Such techniques may prove especially beneficial for horizontal wells.

Figure 7:
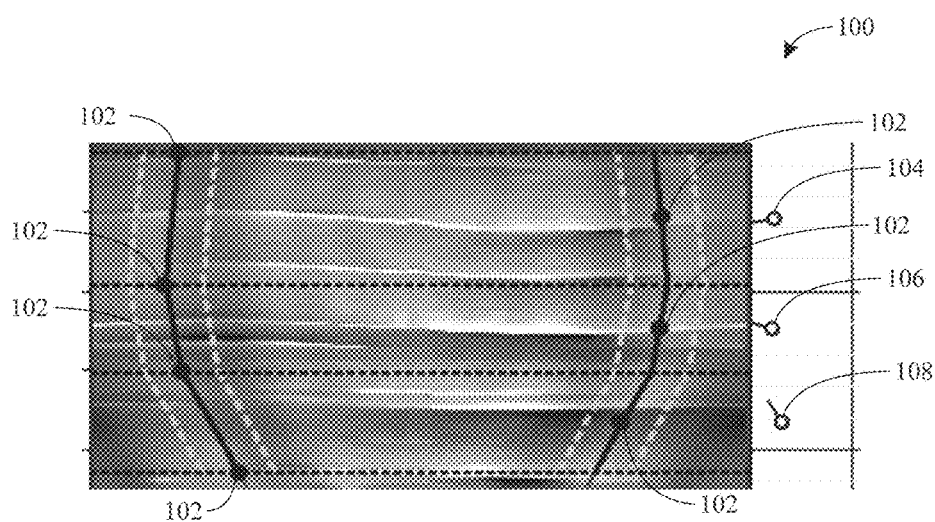
FIG. 7 illustrates a resistivity image where multiple points are selected to define three dips, in accordance with an embodiment.

In some embodiments, multiple points on the borehole image 44 are picked and using the multiple points to define multiple dips and/or planes to fit the boundary. By picking the boundary with multiple dips at once, and eventually picking the entire boundary, it may be more accurate and efficient in maintaining consistency between each of the dips (e.g., same azimuth), but may also allow understanding directly during dip picking whether a boundary fits a perfect plane. For example, FIG. 7 illustrates a resistivity image 100 where multiple (7) points 102 are selected to define three dips 104, 106, and 108, in accordance with an embodiment.

Some embodiments of the present disclosure enable dip picking to be performed on any boundary regardless of its shape. Further, the disclosed dip picking embodiments may improve azimuth accuracy on horizontal wells. Further details regarding dip picking are described below with regard to FIG. 8.

Figure 8:
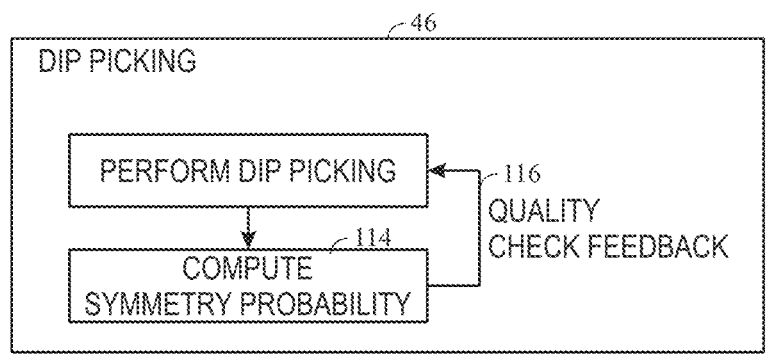
FIG. 8 is a flow diagram of a process for performing dip picking using symmetry probability computation feedback, in accordance with an embodiment.

As depicted in FIG. 8, a flow diagram of a process 110 for performing dip picking using symmetry probability computation feedback is shown, in accordance with an embodiment. In some embodiments the process 110 may be executed in block 46 from the process 40 of FIG. 2. As such, the process 110 may also be executed by the processor 30 of the data processing system 28. The process 110 may include the processor 30 performing (block 112) dip picking. The dip picking may be performed manually or automatically by the processor 30 identifying dips on the borehole image 44. For example, the processor 30 or the user may define multiple dips/plane concurrently by picking multiple points. The points may be grouped into triplets of points. Each triplet may define a "dip unit," which may:

include a plane which crosses each of the points
be defined strictly between the top measured depth and the bottom measured depth among the triplets
have its own dip value
have a connection to previous and/or next "dip units" because the dip units describe the same, continuous boundary The points may be ordered by ascending or descending depth order. The triplets to consider for defining dip units are the triplets {n, n+1, n+2} where n is an odd number and represents the order (e.g., starting counting from 1) of the point. The dip unit is related to other dip units by merging the points at their extremities: the points at odd number index, except the first (1) and the last, belong to two dip units. In effect, two consecutive planes may have at least one common point, ensuring continuity of the boundary. Points may be moved, added, or deleted to change the number of dip units.

Figure 9:
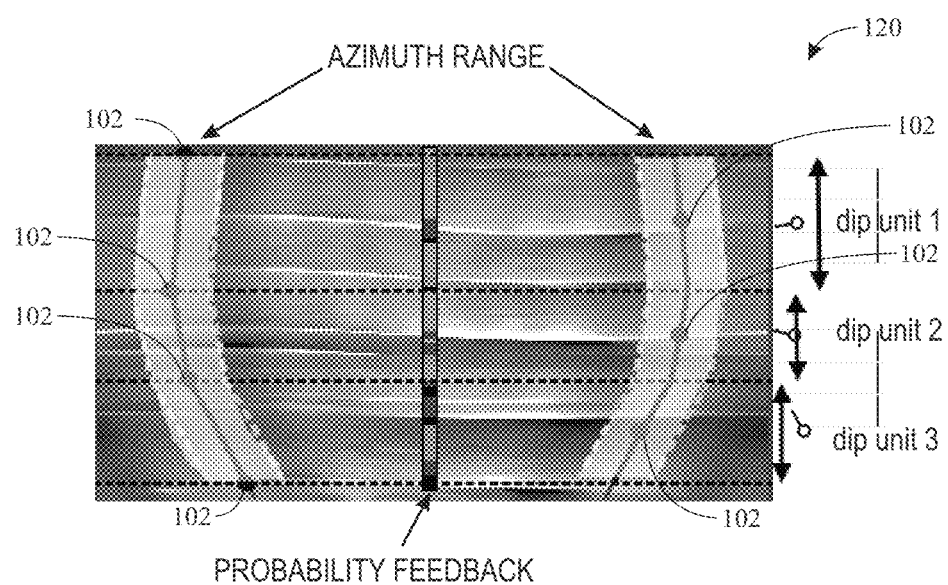
FIG. 9 illustrates a resistivity image where multiple points are selected to define three dips using symmetry probability feedback, in accordance with an embodiment.

For example, FIG. 9 illustrates a resistivity image 120 where multiple (7) points 102 are selected to define three planes (dip unit 1, dip unit 2, dip unit 3) following each other. In some embodiments, the locations of the triplet points may be automatically suggested by the processor 30. In some embodiments, the user may manually place the points of the triplet. In some embodiments, any suitable user interface may be used to pick multiple dip units. For example, a range may be defined (e.g., manually or automatically) where the orientation of the boundary is the same and dips may be defined in each range such that continuity between each range is maintained.

For each dip unit defined above, an intersection of a plane may be defined by the triplet of the dip unit and the borehole and may be limited to the depth range within the points {n, n+2}. That is, a plane may be fit manually or automatically that crosses the borehole in 3D space. Changes in the borehole trajectory or geometry, as well as changes in boundary orientation (e.g., a feature is not strictly planar) may be accounted for. In some embodiments, the borehole image 44 used for defining the intersection may include an accurate and high resolution survey of the borehole measured depth, trajectory (well deviation and well azimuth), and geometry (calipers, eccentering).

Once the dips have been identified or marked on the borehole image 44, the processor 30 may compute (block 114) a symmetry probability (e.g., vertical symmetry probability) based on the orientation (e.g., inclination and/or azimuth) of the dip. The symmetry probability may be directly dependent on the picked dip by selecting relevant data around the intersection trace. More specifically, the intersection of the dip unit defined above may be used to obtain image data within an azimuth range around the intersection trace, as depicted in FIG. 9. The azimuth range may be taken as a base to compute the symmetry probability of the dip unit. The symmetry probability may be scaled to a range (e.g., from −1 to 1) and is fed back to the user and/or the processor 30 through an indicator (probability feedback in FIG. 9) matching the scale. The symmetry probability may be fed back to the user as a quality check (arrow 116). In some embodiments, the user or the processor 30 may correct the dip (e.g., azimuth and/or inclination) and the feedback may be updated until satisfactory.

When a point of a triple changes location, the process 110 may be repeated to refresh the dip unit and the others involved. Also, in some embodiments, the processor 30 may adjust/correct a dip unit by moving a point within a searching range on the borehole image and the symmetry probability may be estimated again until a desirable probability is attained.

The process 110 may enable more flexibility in defining dips, avoids being impacted by image artifacts and unsymmetrical features by selecting just relevant data, while still maintaining the possibility to constrain the azimuth component of the picked trace by searching for the desired symmetry probability.

Zonation

Figure 10:
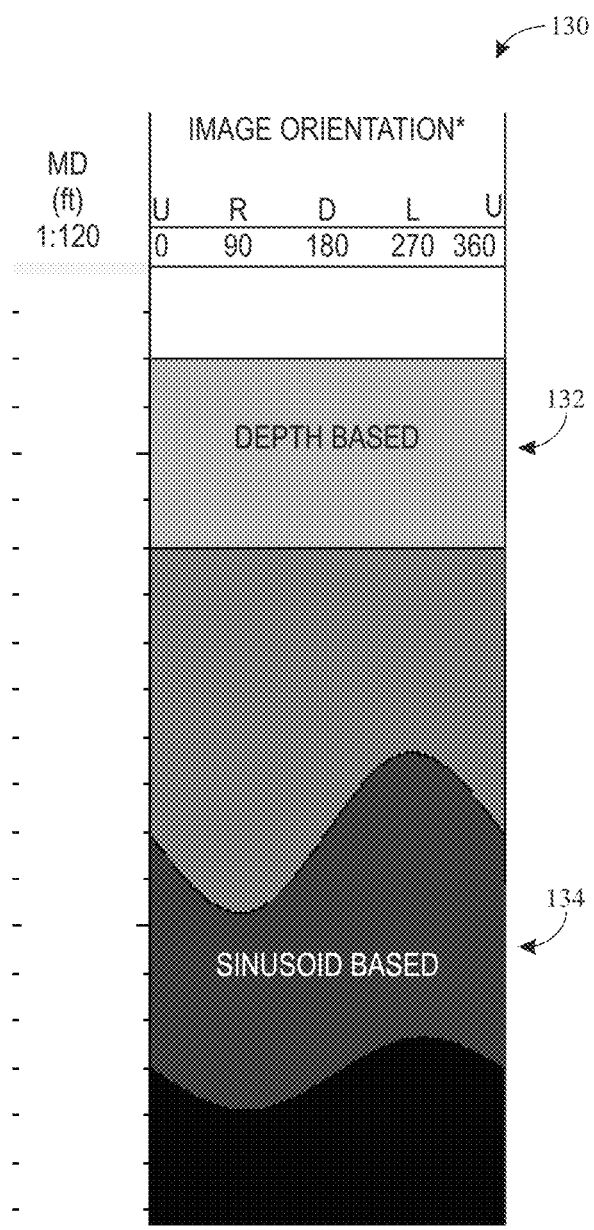
FIG. 10 illustrates an image with depth-based zonation and sinusoid-based zonation.

As discussed above, zonation or zoning may refer to the process of dividing a borehole image 44 into multiple areas of interest, where each area share similar properties (e.g., lithology, rock type, background resistivity, texture, etc.). FIG. 10 illustrates an image 130 that depicts a problem with other techniques that just manually define zones as intervals between a top and bottom depth 132 or between a top and bottom sinusoid 134. The embodiments of zonation disclosed herein may provide an accurate and realistic zonation on a borehole image 44 that may be achieved with zone boundaries following the geological boundaries.

In vertical wells, the intersection of natural boundaries and the borehole can generally be considered as planar. On a borehole image, the intersection trace is displayed as a single sinusoid, or could even be simplified to a horizontal line in the perpendicular case. This is not necessarily true in the subparallel case, when the angle between borehole trajectory and layer surface is low. The intersection surface becomes very long and may not even be considered as planar, as the borehole trajectory and the layer orientation will change. On the borehole image, this intersection may span long distances, appearing as long vertical rails. Additionally, a layer boundary followed by the well in a highly deviated or horizontal well may not be well represented by a sinusoid, and several layer boundaries may be present at one measured depth.

Figure 11:
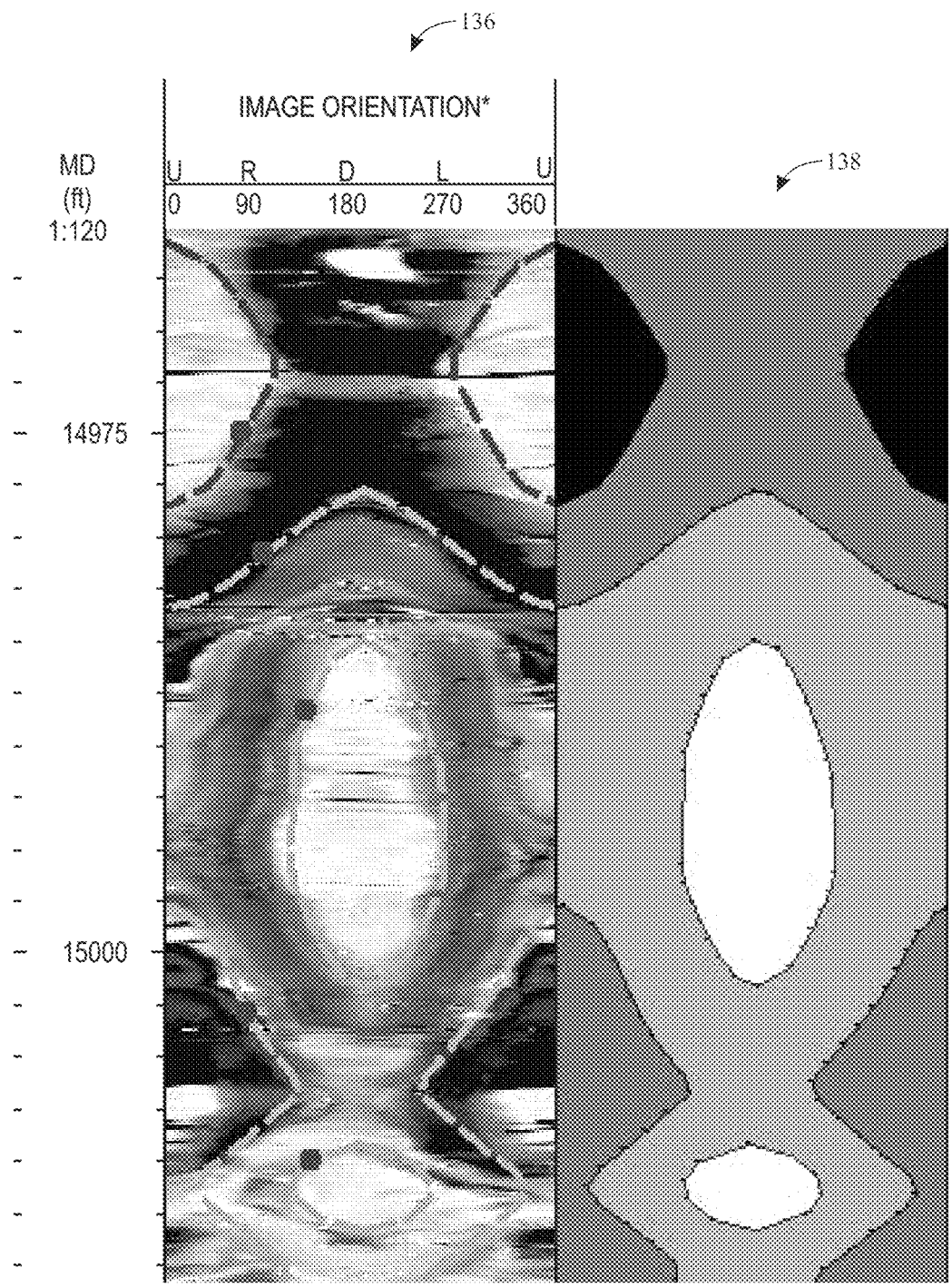
FIG. 11 illustrates a borehole image of a horizontal well and matching zones resulting from zonation, in accordance with an embodiment.

Accordingly, embodiments of zonation discussed herein may be applicable in boreholes from vertical to highly deviated, but more relevant to boreholes where the trajectory orientation is close or parallel to the structural layer orientation. For example, accurate zonation may be enabled for borehole images 44 where the layers are subparallel to the borehole, as may be seen in highly deviated or horizontal wells. To illustrate, FIG. 11 depicts a borehole image 136 of a horizontal well that displays multiple zones simultaneously at a given depth and another image 138 that includes the matching zonation that results from using disclosed embodiments. Improved zonation described herein may be of interest for borehole image interpretation: accurate zonation with respect to geological boundaries allows interpreting data in a more relevant manner, such as characterization zone by zone; correlation to find zones with similar properties or zones already crossed beforehand on highly deviated wells; additional information for structural modeling, around one well or between multiple wells.

The embodiments related to the zonation techniques may be better explained with reference to blocks 54, 58, 62, and 66 of the process 40 depicted in FIG. 2. In particular, the zonation techniques may include computing (block 54) continuous structural dip, defining (block 58) locations of zone boundaries, computing (block 62) zone boundaries, and defining (block 66) zones. It should be noted that the zonation techniques may include assuming that at a given measured depth of the borehole, the structural layers locally respect exactly the same structural dip (e.g., inclination and azimuth).

Beginning with block 54, the processor 30 may compute the continuous structural dip 56 from provided structural dips 52, regardless of their origin. Computing a continuous structural dip may refer to providing a structural dip at each measured depth of the processed interval. One structural dip is the orientation of one 3D plane and may be defined as a pair of absolute angles (inclination and azimuth). The continuous structural dip is a function of provided structural dips.

Figure 12:
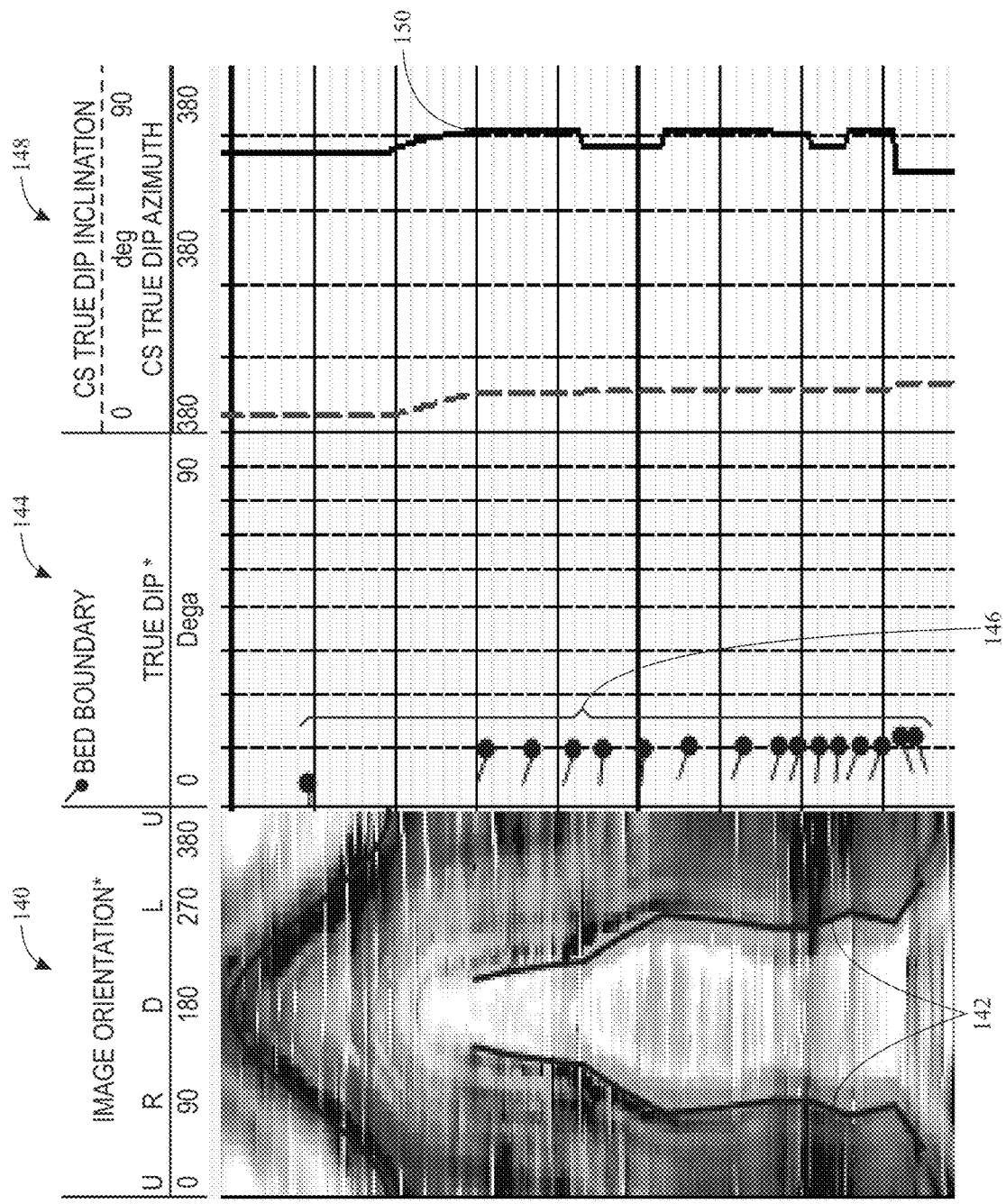
FIG. 12 illustrates a borehole image of a highly deviated well including a superimposed representation of structural dips in borehole frame, an image of the identified structural dips, and an image of continuous structural dip inclination and azimuth, in accordance with an embodiment.

For example, FIG. 12 illustrates a borehole image 140 of a highly deviated well including a superimposed representation of structural dips 142 in borehole frame, an image 144 of the identified structural dips 146, and an image 148 of continuous structural dip 56 inclination and azimuth, in accordance with an embodiment. At a given depth, a provided structural true dip may not exist, in which case the continuous structural dip 56 may be interpolated as a function of the measured depth from other provided structural dips 52 (e.g., a linear interpolation of nearest dips). Similarly, at a given depth, multiple provided structural dips 52 may exist, in which case the continuous structural dip 56 is a function of a subset of (possibly each of) the provided structural dips 52 (e.g., an average). In some embodiments, the provided structural dips 52 may be obtained by the embodiments of dip picking described above for enhanced zonation. In some embodiments, the provided structural dips 52 may be obtained by any suitable method of dip picking.

Figure 13:
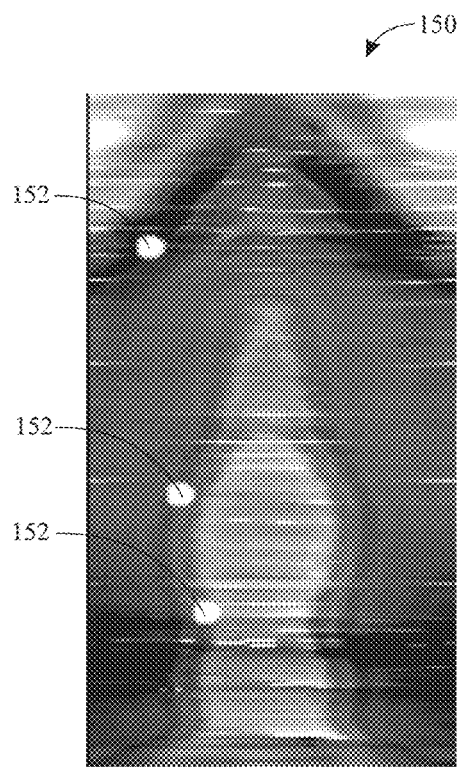
FIG. 13 illustrates three locations identified on the borehole image to be crossed by a zone boundary, in accordance with an embodiment.

The processor 30 may define (block 58) multiple points (locations 60) on the borehole image 44 as zone boundaries. That is, the processor 30 may define the points in 3D space where the zone boundaries (e.g., 3D surfaces) cross the borehole (e.g., 3D volume). These points may be located on the borehole (e.g., on the borehole image 44) and should be placed on bed boundaries visible on the borehole image 44. For example, FIG. 13 depicts a borehole image 150 with picked points 152 intended to be zone boundaries. In some embodiments, the points may be interactively defined by the user on the borehole 44 and/or automatically suggested or selected programmatically by the processor 30 locating bed boundaries on the borehole image through image processing.

The processor 30 may compute (block 62) zone boundaries using the continuous structural dip 56, the locations of zone boundaries 60, and/or the information 50 related to borehole geometry and trajectory. The processor 30 may compute the intersection of a zone boundary (e.g., 3D surface) and the borehole (e.g., 3D volume). The intersection may be computed depth by depth, incrementally, starting at a depth where the zone boundary is known to intersect the borehole (e.g., a "starting" point defined above in block 58). In some embodiments, the processor 30 uses the Cartesian coordinates of the borehole center. The coordinates may be derived using the processor 30 or received via another source (e.g., third-party software application).

Figure 14:
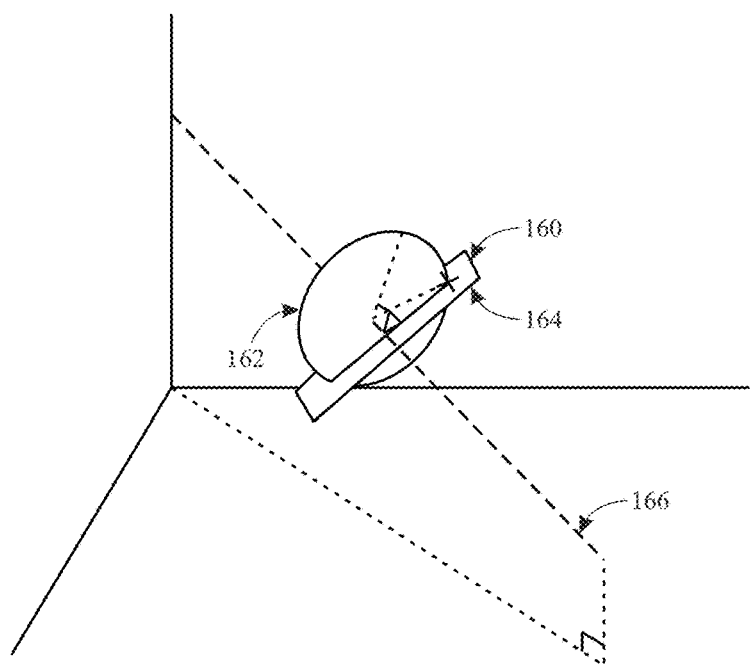
FIG. 14 illustrates a three-dimensional (3D) surface (e.g., zone boundary) crossing a borehole slice of a highly deviated or horizontal well, in accordance with an embodiment.

At a given measured depth d, the borehole geometry (caliper and eccentering), the borehole trajectory (deviation and azimuth), and the continuous structural dip 56 may be used to characterize the borehole slice, and to determine if and how the zone boundary intersects this slice. For example, FIG. 14 illustrates a three-dimensional (3D) surface 160 (e.g., zone boundary) crossing a borehole slice 162 of a highly deviated or horizontal well, in accordance with an embodiment. As depicted, the processor 30 starts from a starting point 164 defined during block 58. Further, the borehole center trajectory 166 is subparallel, thereby indicating this is a highly deviated or horizontal well.

The computation of the intersection may be formulated as follows:

At a depth d, for:

A, known intersection point of both the 3D surface and the borehole slice at d p, known pole of a 3D surface at d, with inclination θ and azimuth α

S, known point of borehole slice at d' at azimuth α

B, unknown intersection point of both the 3D surface and the borehole slice at d', located at azimuth β

R, radius of the borehole at d' including DOI

Given the following formula:

$$0 = \vec{AB} \cdot \vec{p} = (\vec{AS} + \vec{SB}) \cdot \vec{p} = (\vec{AS} \cdot \vec{p})_{true} + (\vec{SB} \cdot \vec{p})_{apparent} \quad \text{(Equation 1)}$$

Apparent refers to apparent coordinate system (e.g., coordinate system attached to the downhole tool 12). True refers to true coordinate system. The scalar product are identical whatever the coordinate system, but sometimes easier to calculate in one coordinate system versus another one.

Using the borehole geometry and trajectory, $(\vec{AS} \cdot \vec{p})_{true}$ is completely defined.

With:

$$\vec{p} = \begin{bmatrix} \sin\theta\cos\alpha \\ \sin\theta\sin\alpha \\ \cos\theta \end{bmatrix}$$

(with apparent or true angle, depending on the coordinate system)

$$\vec{SB} = \begin{bmatrix} R(\cos\beta - \cos\alpha) \\ R(\sin\beta - \sin\alpha) \\ 0 \end{bmatrix} \text{ (in apparent coordinate system)}$$

The resulting equation may be represented as follows:

$$\cos(\alpha - \beta) = 1 - \frac{(\vec{AS}\cdot\vec{p})_{true}}{R\sin\theta} \quad \text{(Equation 2)}$$

β may be computed, hence B. The point B and its symmetric in regard with the apparent dip azimuth computed from the continuous structural true dip at d' defines the intersection line between borehole slice at d' and the 3D surface.

Figure 15:
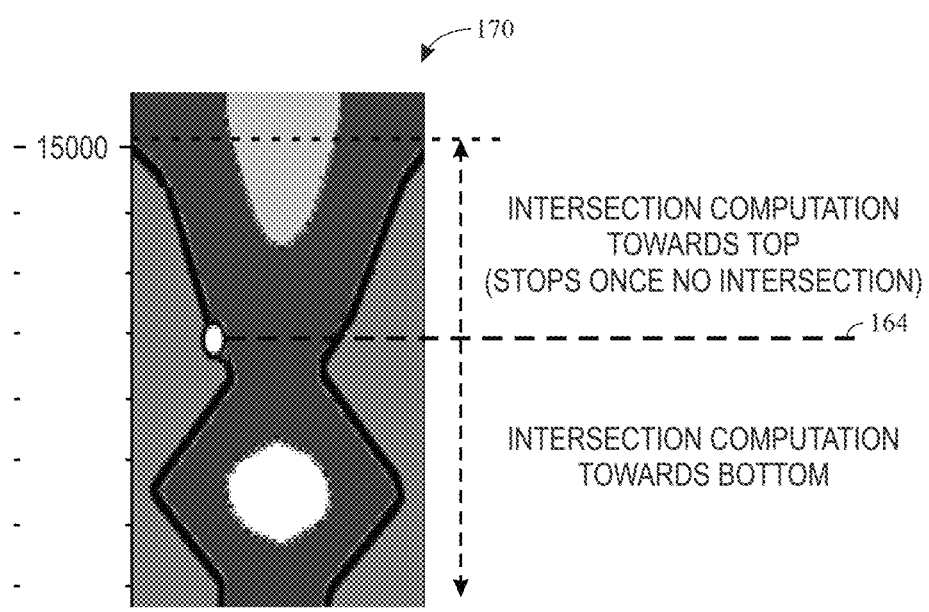
FIG. 15 illustrates intersection computation on a borehole image, in accordance with an embodiment.

The processor 30 may incrementally repeat the computation until the borehole and the 3D surface do not intersect anymore. The processing may stop and then restart from the starting point defined in block 58 to cover the other direction (e.g., towards well bottom or top). For example, FIG. 15 illustrates intersection computation on a borehole image 170, in accordance with an embodiment. As depicted, the computation described above may be performed iteratively by the processor 30 to compute the intersection towards the top of the well from the starting point 164 and then computes the intersection towards the bottom of the well from the starting point 164.

Figure 16:
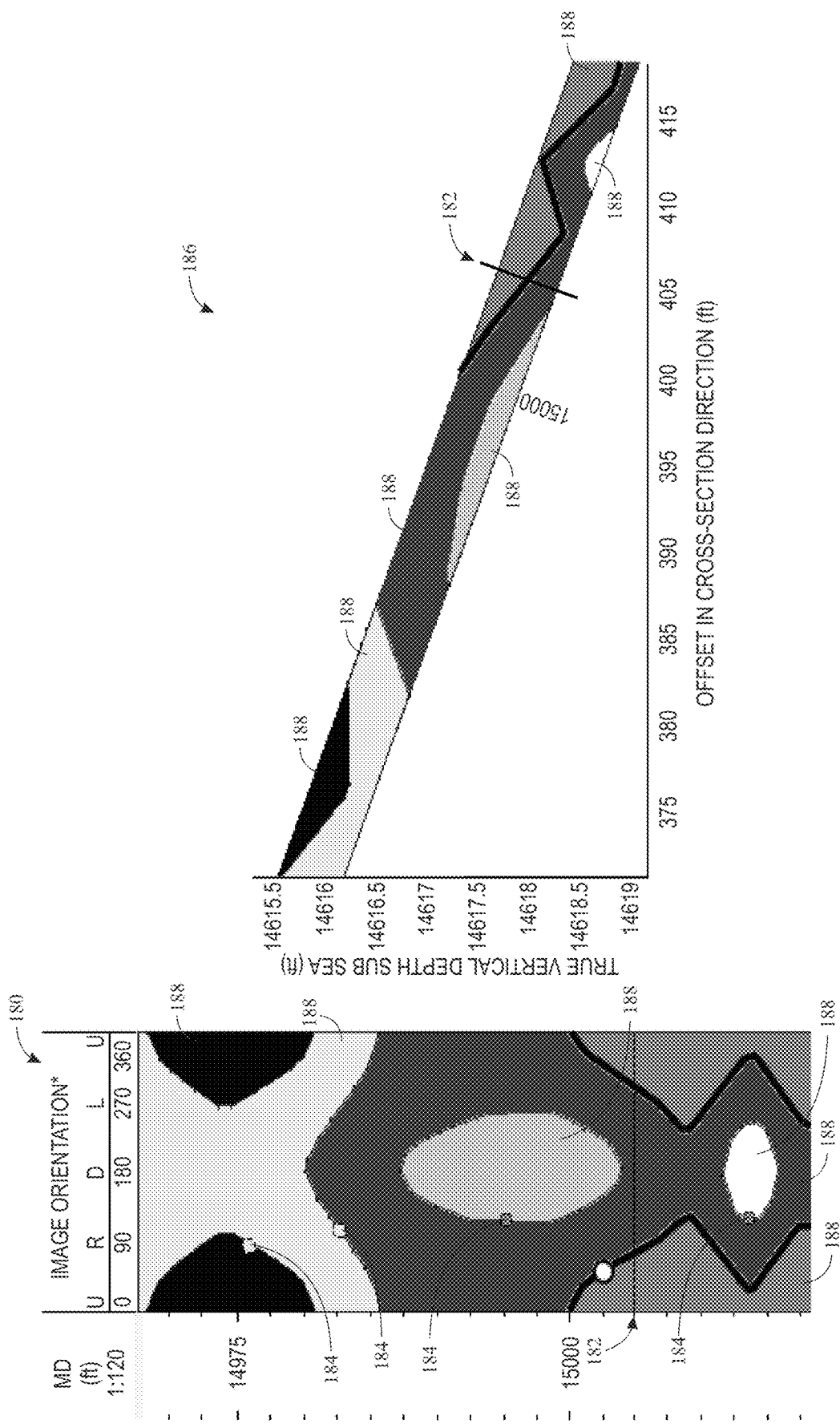
FIG. 16 illustrates a synthetic borehole image where zonation has identified six zones based on five defined boundaries, in accordance with an embodiment.

As a result, for borehole slices at each depth, the processor 30 determines if and how the zone boundary intersects the borehole. For example, FIG. 16 illustrates a synthetic borehole image 180 that includes points 184 that define a zone boundary which intersects the borehole (five zone boundaries are defined). A cross-section view 186 is also depicted of the borehole. The information pertaining to if and how the zone boundaries intersects the borehole may be presented in several formats, including but not limited to: on the borehole image 180, the zone boundary intersects the borehole image at most twice per depth level (as shown by a borehole slice represented by a dashed line 182 on image 180); on the section view 186 of the borehole, the zone boundary intersects the borehole image at most once per depth level view (as shown by the borehole slice represented by the dashed line 182 on image 186).

The zone boundaries may include the property not to cross each other within the borehole as a result of the structural layers locally respecting exactly the same structural dip (e.g., inclination and azimuth) at a given measured depth of the borehole. Geological features such as faults are natural end point of zone boundaries. An additional processing step may be applied to interrupt a zone boundary when it crosses a fault or other major discontinuity.

Additionally, the processor 30 may define (block 66) zones 68 from the zone boundaries 64. As previously discussed, a zone boundary or fault crossing the borehole divides the borehole volume into two separate parts. By aggregating zone boundaries and faults, the borehole volume is divided into (zone boundary count+fault count+1) zones. This information can be represented on multiple formats. For example, in FIG. 16, on the borehole image 180, the zones 188 are closed shapes bound by zone boundaries and/or faults. On the cross-section view 186 of the borehole, the zones 188 are closed shapes bound by zone boundaries and/or faults. As depicted, there are six zones divided by five zone boundaries in FIG. 16.

The specific embodiments described above have been shown by way of example, and it should be understood that these embodiments may be susceptible to various modifications and alternative forms. It should be further understood that the claims are not intended to be limited to the particular forms discloses, but rather to cover modifications, equivalents, and alternatives falling within the spirit of this disclosure.

The invention claimed is:

1. A computer-based method (40) comprising:
    obtaining (42) a borehole image (44) deriving from a downhole tool (12) in a borehole of a geological formation (14);
    performing (46) dip picking on the borehole image (44) to derive one or more structural dips (42) in a depth interval, wherein a structural dip is an orientation of a 3D plane crossing the borehole;
    deriving (54) a continuous structural dip (56) based on the one or more structural dips (42), wherein the continuous structural dip is a function representing continuously the structural dip as a function of depth in the depth interval;
    defining (58) one or more locations of zone boundaries (60) on the borehole image (44);
    deriving (62) one or more zone boundaries (64) based on the continuous structural dip (56) and the one or more locations of zone boundaries (60); and
    defining (66) one or more zones (68) of the wellbore in a second image based on the one or more zone boundaries (64).

2. The method (40) of claim 1, wherein the geological formation (14) includes a well that is highly deviated, horizontal, or both.

3. The method (40) of claim 1, wherein performing (46) dip picking comprises determining an orientation of one or more boundaries, faults, or both in the borehole image (44) by selecting multiple dips at substantially the same time for each of the one or more boundaries, faults or both, wherein the orientation is characterized by an inclination and an azimuth.

4. The method (40) of claim 1, comprising deriving (114) a vertical symmetry probability for each of the one or more structural dips (52) using image data from the borehole image (44) within an azimuth range around an intersection trace, and determining whether the vertical symmetry probability for each of the one or more structural dips (52) meets a sufficient value on a scale.

5. The method (40) of claim 1, wherein the dip picking is performed based on a borehole trajectory (50) comprising an azimuth and a deviation, a borehole geometry (50) comprising a caliper, user input (48) comprising a collection of points on the borehole image, or some combination thereof.

6. The method (40) of claim 1, wherein the continuous structural dip (56) is a function of the one or more structural dips (52), wherein, at depths in the borehole where no structural dips are derived, interpolation is used to derive the continuous structural dip (56), and, at depths where multiple structural dips (52) are derived, a subset of the structural dips (52) are processed to derive the continuous structural dip (56).

7. The method (40) of claim 1, wherein defining (58) the one or more locations of zone boundaries (60) on the borehole image (44) comprises defining points in three-dimensional (3D) space where the zone boundaries cross the borehole.

8. The method (40) of claim 7, wherein defining the points in the 3D space where the zone boundaries cross the borehole comprises:
- programmatically defining the one or more locations of zone boundaries (60) on the borehole image (44) using image processing;
- receiving user input (46) comprising points on the borehole image (44) indicative of the one or more locations of zone boundaries (60); or
- some combination thereof.

9. The method (40) of claim 1, wherein deriving (66) one or more zone boundaries (64) based on the continuous structural dip (56) and the one or more locations of zone boundaries (60) comprises deriving an intersection of a zone boundary of the one or more zone boundaries (64) and the borehole incrementally depth by depth using Cartesian coordinates of a center of the borehole, wherein at a given measured depth, a borehole geometry (50), a borehole trajectory (50), and the continuous structural dip (56) are used to characterize a borehole slice and determine whether the zone boundary (64) intersects the borehole slice.

10. The method (40) of claim 9, wherein determining whether the zone boundary (64) intersects the borehole slice is based on the following relationship:

at a depth d, for:
A, known intersection point of both the zone boundary and the borehole slice at d
p, known pole of the zone boundary at d, with inclination θ and azimuth α
S, known point of the borehole slice at d at azimuth α
B, unknown intersection point of both the zone boundary and the borehole slice at d', located at azimuth β
R, radius of the borehole at d' including DOI
given the following formula:

$$0 = \vec{AB} \cdot \vec{p} = (\vec{AS} + \vec{SB}) \cdot \vec{p} = (\vec{AS} \cdot \vec{p})_{true} + (\vec{SB} \cdot \vec{p})_{apparent}$$

apparent refers to apparent coordinate system, true refers to true coordinate system, and using the borehole geometry and the borehole trajectory, $(\vec{AS} \cdot \vec{p})_{true}$ is completely defined, with:

$$\vec{p} = \begin{bmatrix} \sin\theta\cos\alpha \\ \sin\theta\sin\alpha \\ \cos\theta \end{bmatrix}$$

$$\vec{SB} = \begin{bmatrix} R(\cos\beta - \cos\alpha) \\ R(\sin\beta - \sin\alpha) \\ 0 \end{bmatrix}$$

the resulting equation is represented as follows:

$$\cos(\alpha - \beta) = 1 - \frac{(\vec{AS} \cdot \vec{p})_{true}}{R \sin\theta}$$

the point B and its symmetric in regard to an apparent dip azimuth are derived from the continuous structural true dip (56) at d', which defines an intersection line between the borehole slice at d' and the zone boundary (64).

11. A system (10), comprising:
one or more sensors configured to obtain a borehole image (44) of a geological formation (14); and
one or more data processing systems (28) comprising one or more processors (30) that:
- receive (42) the borehole image (44); and
- perform (46) dip picking on the borehole image (44) to derive one or more structural dips (52), wherein dip picking comprises determining an orientation of one or more boundaries, faults, or both in the borehole image (44) by identifying multiple dips at substantially the same time for each of the one or more boundaries, faults, or both, and wherein the orientation is characterized by an inclination and an azimuth,
- derive (114) a vertical symmetry probability for each of the one or more structural dips (52) using image data from the borehole image (44) within an azimuth range around an intersection trace, and determining whether the vertical symmetry probability for each of the one or more structural dips (52) meets a sufficient value on a scale.

12. The system (10) of claim 11, wherein the one or more processors (30):
- derive (54) a continuous structural dip (56) based on the one or more structural dips (52), wherein the continuous structural dip is a function representing continuously the structural dip as a function of depth;
- define (58) one or more locations of zone boundaries (60) on the borehole image (44);
- derive (62) one or more zone boundaries (64) based on the continuous structural dip (56) and the one or more locations of zone boundaries (60); and
- define (66) one or more zones (68) of the wellbore in a second image based on the one or more zone boundaries (64).

13. The system (10) of claim 11, wherein defining (66) one or more zones (68) of the wellbore in a second image based on the one or more zone boundaries (64) comprises aggregating each of the zone boundaries (64) to divide the borehole into the one or more zones (68) on the second image.

* * * * *